Oct. 19, 1965     PER BORJE FONDEN ETAL     3,212,736
ARRESTING NET FOR AIRCRAFT
Filed Nov. 19, 1963                          2 Sheets-Sheet 1
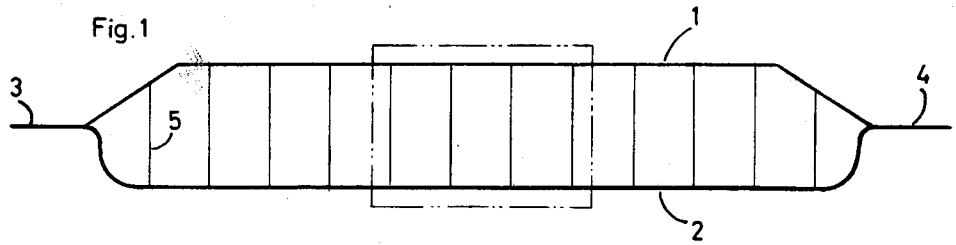
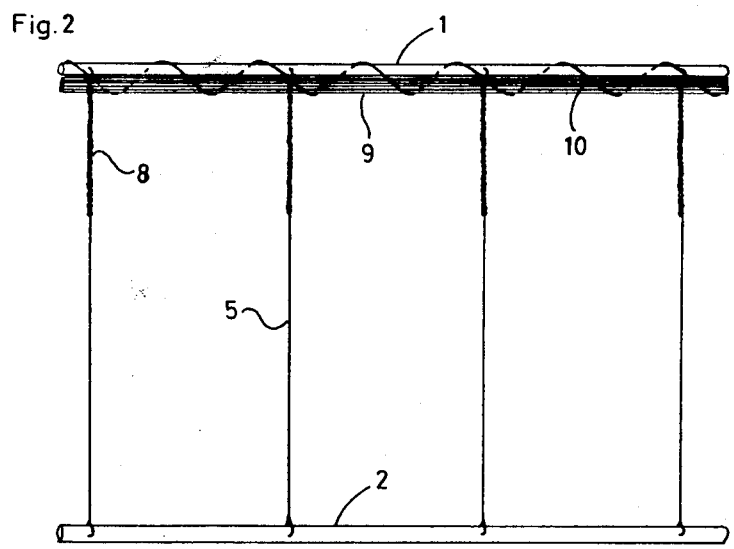
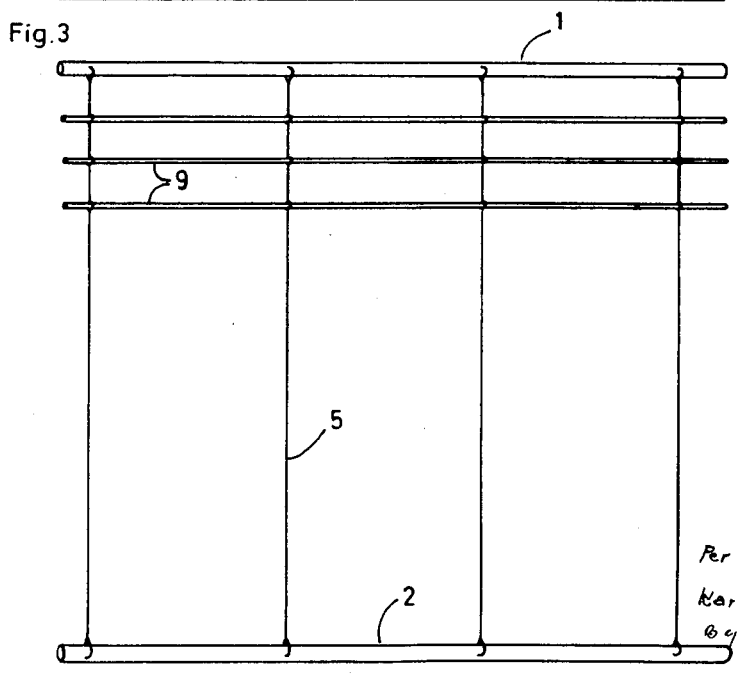
INVENTOR.
Per Borje Fonden
Karl Ove Torgny Walond Oct. 19, 1965   PER BORJE FONDEN ETAL   3,212,736
ARRESTING NET FOR AIRCRAFT
Filed Nov. 19, 1963   2 Sheets-Sheet 2

United States Patent Office 3,212,736
Patented Oct. 19, 1965

3,212,736
ARRESTING NET FOR AIRCRAFT
Per Borje Fonden, Hejdegatan 3, and Karl Ove Torgny Walander, Elsa Brandstromgata 5, both of Linkoping, Sweden
Filed Nov. 19, 1963, Ser. No. 324,797
Claims priority, application Sweden, Nov. 20, 1962, 12,415/62
5 Claims. (Cl. 244—110)

This invention relates to arresting devices for aircraft, and more particularly to nets which serve to arrest aircraft during landing or take-off and where a landing in limited space is necessary.

There are in existence arresting devices which include nets employed as the restraining means for aircraft which, for any reason, cannot normally stop in the space available for take-off or landing. These nets have hitherto been generally intended for military aircraft of sturdy construction which can therefore be subjected to heavy loads while being arrested and without suffering excessive damage.

In the case of modern civil air liners, such as jet-propelled aircraft having large, moderately-swept wings, the problems associated with net arresting are in certain cases less serious than for military aircraft. Air liners have large wings which are well suited for arresting, and the aircraft are of such dimensions that distributing of the load is fairly simple. On the other hand, the relatively great liability to damage to the aircraft presents some problems that are difficult to solve. A number of aircraft types have, for example, engine pods that project in front of the leading edge of the wing and are so easily damaged that if heavy cables associated with the net were placed in front of them for arresting the aircraft there would be considerable danger of the pods being broken off, resulting in serious damage and danger of fire.

A still more serious difficulty is that the stressed skin air frame offers very little resistance to point loading. A net of conventional construction is in principle composed of an upper and a lower horizontal cable between which vertical cables extend. If the aircraft is a low-wing type it will produce large downward loads on the upper cable, as can be easily demonstrated geometrically, and conversely there will be a large upward load under the fuselage on the lower cable if the aircraft is a high-wing type. As almost all modern air liners are of low-wing type there are therefore difficulties, when applying large loads to the aircraft during arresting, in preventing the pressure of the upper cable on the fuselage from becoming so great that the cable breaks into the cabin and endangers the safety of the passengers.

It is an object of the invention to provide an arresting device which solves the problems associated with the forwardly projecting engine pods and the pressure on the fuselage and especially that imposed on the upper part.

More particularly, the invention contemplates the provision of an arresting net which includes a substantially horizontal upper cable or a group of upper cables and at some distance therefrom a substantially horizontal lower cable or group of such cables, and which upper and lower cables are connected with each other at the ends and are also connected by means of braking cables to brakes, said upper and lower cables being connected by a number of vertical cables arranged to fold around the leading edge of the wing of the aircraft during arresting. The invention is further characterized by the fact that the upper cable or cables on the one hand, and the lower cable or cables on the other hand are different in length. By suitably choosing the difference in length it is possible to vary the magnitude of the vertical force components of the contact pressure of the cables on the aircraft.

With these and other objects to be hereinafter set forth in view, we have devised the arrangement of parts to be described and more particularly pointed out in the claims appended hereto.

In the accompanying drawings, wherein an illustrative embodiment of the invention is disclosed, FIG. 1 is a diagrammatic disclosure of an erected net as constructed according to the invention;

FIG. 2 shows, on a larger scale, the part of the net that is framed in broken lines in FIG. 1;

FIG. 3 shows the net in accordance with FIG. 2 as it appears when arresting of an aircraft has started, although the aircraft is not shown;

Figure 4:
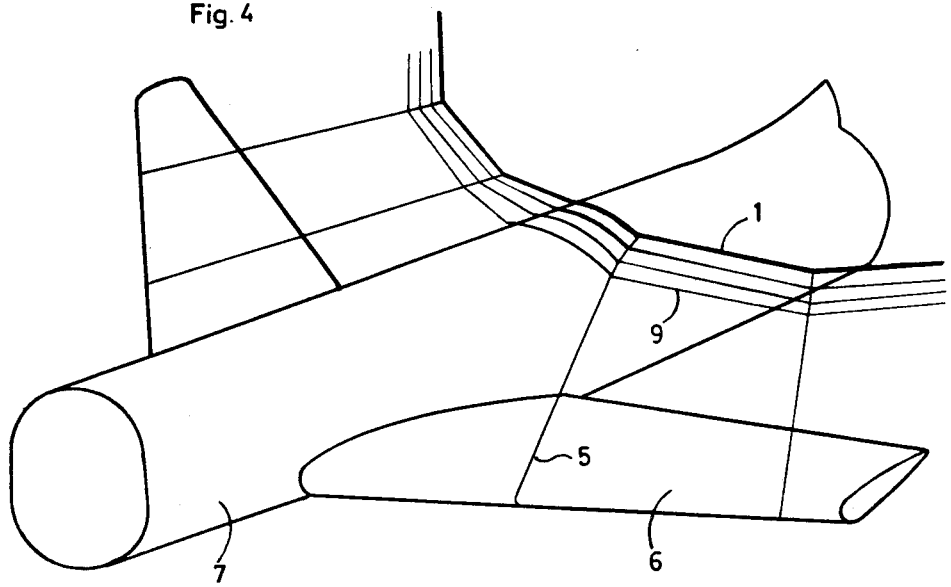
FIG. 4 shows in perspective the part of an aircraft that is engaged by the net.
Figure 5:
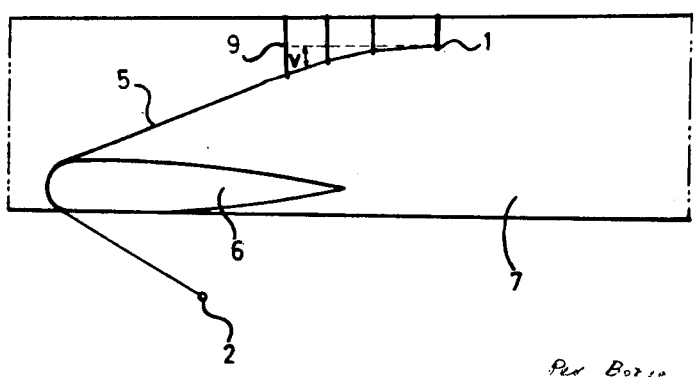
FIG. 5 diagrammatically shows the aircraft as engaged by the arresting device.

In the drawings an upper cable is shown at 1 and 2 indicates a lower cable which is of greater length than the upper cable. These cables 1 and 2 are connected with each other at their ends and are connected to the braking cables 3 and 4. Between the cables 1 and 2 there are arranged vertical cables 5, which are considerably longer, and in fact about twice as long as the distance between the cables 1 and 2 when the net is in its erect position of readiness as shown in FIG. 2, that is, in position for arresting an aircraft, but before the arresting action has begun. The cables 5 are intended to be caught up by the wings 6 of the aircraft as shown in FIGS. 4 and 5.

Because of the fact that the upper cable is considerably shorter than the lower cable, the upper cable will therefore extend considerably further aft on the fuselage 7 than will the longer lower cable 2 will extend when the aircraft runs into the net. By reason of this, the angle indicated at V in FIG. 5, developed by the loaded upper sections of the cables 5 and the horizontal plane through the upper cable will be much smaller than would be the case with conventional net constructions. This results in the vertical force component with which the upper cable acts on the fuselage, being reduced correspondingly. The angle V and thus the vertical force component can be reduced still further by increasing the length of the cables 5.

In the collapsed and operative positions of the net the excess lengths of the cables 5 are folded or twisted together at indicated at 8 in FIG. 2. This produces the advantageous effect that during the initiation phase when the aircraft has entered the net the cables 5 will increase in length under a very low load and the cables 5 which may have come to rest against forwardly projecting parts of the aircraft, such as forwardly projecting engine pods, will be shaken free of said forwardly projecting parts during the unwinding of the folded or twisted parts 8 of the cables.

According to the invention, the vertical cables 5 can also be connected with one or more additional horizontal cables 9 arranged adjacent to the upper cable 1. As these additional cables 9 connect the folded or twisted parts of the cable 5 they do not form meshes in the net in the readiness phase of the net, but they lie as shown in FIG. 2 along the upper cable, and they are connected together by a thin cable 10 spirally wound around them, said thin cable breaking when the aircraft encounters the net. Only when the net has been extended to the position shown in FIG. 3 will the cables 9 be located at any distance from the upper cable 1.

The additional cables 9 act as shown in FIG. 5, the same bending over the fuselage and raising parts of the cables 5, and this contributes to a further reduction of the angle V, and part of the downward pressure with which the upper cable otherwise would act on the fuselage will be transferred to the additional cables 9. This device produces the desired distribution of the load from the upper cable over a larger area of the upper part of the fuselage. This enables larger loads to be placed on the upper cable without increasing its pressure on the fuselage.

In order to render the load distribution over the upper part of the fuselage uniform when several additional cables 9 are employed, it may be advantageous to make the cables 9 of different degrees of elasticity or resiliency. For example, the cable 9 nearest to the upper cable 1 would be made fairly stiff and the other cables 9 increasingly flexible according to their distances from the upper cable. The same effect is obtained with additional cables that are longer than the upper cable. They can alternatively be made both longer and with greater resiliency than the upper cable.

Having thus described an embodiment of the invention, it is obvious that the same is not to be restricted thereto, but is broad enough to cover all structures coming within the scope of the annexed claims.

What we claim is:

1. An arresting net for aircraft comprising, a substantially horizontal upper cable and a substantially horizontal lower cable, said upper and lower cables being joined together at the ends and being connected by means of braking cables to brakes, and also being connected together between their ends by a number of vertical cables which will fold around the leading edges of the wings of an aircraft during arresting, the upper cable and lower cable being of substantially different lengths for the purpose of enabling the magnitude of the vertical force components of the contact pressure of the cables on the aircraft to be varied by suitable choice of said differences in length, the vertical cables being considerably longer than the distance between the upper and lower horizontal cables, the vertical cables being connected to at least one additional cable arranged adjacent to the upper horizontal cable, said additional cable having a greater resiliency than the upper horizontal cable.

2. An arresting net for aircraft comprising, a substantially horizontal upper cable and a substantially horizontal lower cable, said upper and lower cables being joined together at the ends and being connected by means of braking cables to brakes, and also being connected together between their ends by a number of vertical cables which will fold around the leading edges of the wings of an aircraft during arresting, the upper cable and lower cable being of substantially different lengths for the purpose of enabling the magnitude of the vertical force components of the contact pressure of the cables on the aircraft to be varied by suitable choice of said difference in length, the vertical cables which connect the upper and lower horizontal cables with each other being considerably longer than the distance between the upper and lower cables when the net is in the erect position of readiness, the excess lengths of the vertical cables being twisted together at the top so that the adjacent horizontal cables in the readiness position will be situated close together with the main upper cable.

3. An arresting net for aircraft comprising, a substantially horizontal upper cable and a substantially horizontal lower cable, said upper and lower cables being joined together at the ends and being connected by means of braking cables to brakes, and also being connected together between their ends by a number of vertical cables which will fold around the leading edges of the wings of an aircraft during arresting, the upper cable and lower cable being of substantially different lengths for the purpose of enabling the magnitude of the vertical force components of the contact pressure of the cables on the aircraft to be varied by suitable choice of said differences in length, the vertical cables which connect the upper and lower horizontal cables with each other being considerably longer than the distance between the upper and lower cables when the net is in the erect position of readiness, the vertical cables being connected to one or more substantially horizontal cables arranged adjacent to the upper cable, said additional cables being of a different and preferably greater resiliency than the upper cable, said additional cables having different elasticities, and the same increase in elasticity the farther are their locations from the upper cable.

4. An arresting net for aircraft according to claim 3 wherein said additional cables are situated close to the upper cable when the net is in position of readiness.

5. An arresting net for aircraft according to claim 4 wherein the additional cables are longer than the upper cable.

References Cited by the Examiner

UNITED STATES PATENTS

| 2,854,201 | 9/58 | Cotton | 244—110 |
|---|---|---|---|
| 3,069,118 | 12/62 | Bernard | 244—110 |

FOREIGN PATENTS

| 168,621 | 9/59 | Sweden. |
|---|---|---|
| 883,158 | 11/61 | Great Britain. |
| 1,193,078 | 4/59 | France. |

MILTON BUCHLER, *Primary Examiner.*

ANDREW H. FARRELL, FERGUS S. MIDDLETON,
*Examiners.*